(12) United States Patent
Du

(10) Patent No.: US 10,250,982 B2
(45) Date of Patent: Apr. 2, 2019

(54) SOUND SOURCE APPARATUS

(71) Applicant: Kinpo Electronics, Inc., New Taipei (TW)

(72) Inventor: Yung-Rung Du, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 183 days.

(21) Appl. No.: 15/432,926

(22) Filed: Feb. 15, 2017

(65) Prior Publication Data

US 2018/0192195 A1 Jul. 5, 2018

(30) Foreign Application Priority Data

Jan. 5, 2017 (TW) .............................. 106200179 U

(51) Int. Cl.
*H04R 3/12* (2006.01)
*G06F 3/16* (2006.01)
*H04R 27/00* (2006.01)

(52) U.S. Cl.
CPC .............. *H04R 3/12* (2013.01); *G06F 3/165* (2013.01); *H04R 27/00* (2013.01); *H04R 2227/005* (2013.01); *H04R 2430/01* (2013.01)

(58) Field of Classification Search
CPC .... H04R 3/12; H04R 27/00; H04R 2227/005; H04R 2430/01; G06F 3/165
See application file for complete search history.

(56) References Cited

U.S. PATENT DOCUMENTS

| 9,930,471 B2* | 3/2018 | Robinson ................ H04R 5/04 |
| 2013/0094668 A1* | 4/2013 | Poulsen ................ H03G 3/301 |
| | | 381/107 |
| 2016/0057530 A1* | 2/2016 | Anderson ............ H04R 1/1041 |
| | | 381/384 |
| 2016/0247364 A1* | 8/2016 | Herman .................. G08B 3/10 |
| 2018/0097493 A1* | 4/2018 | Weksler .................. H04R 3/00 |

* cited by examiner

*Primary Examiner* — Regina N Holder
(74) *Attorney, Agent, or Firm* — JCIPRNET

(57) ABSTRACT

A sound source apparatus for receiving an audio signal and displaying the audio signal is provided. The sound source apparatus includes at least two sound source output devices, at least two distance sensors, and a processor. Each distance sensor is installed respectively corresponding to each sound source output device, and is configured to respectively detect at least one target to generate sensing signals. The processor receives the audio signal, and when the processor determines that the at least one target meets a sensing range through respectively receiving the sensing signals generated by each distance sensor, the processor calculates output volume of each sound source output device respectively according to a relative distance between each distance sensor and the at least one target.

9 Claims, 6 Drawing Sheets

SOUND SOURCE APPARATUS

CROSS-REFERENCE TO RELATED APPLICATION

This application claims the priority benefit of Taiwan application serial no. 106200179, filed on Jan. 5, 2017. The entirety of the above-mentioned patent application is hereby incorporated by reference herein and made a part of this specification.

BACKGROUND OF THE INVENTION

Field of the Invention

The invention relates to a sound source apparatus, and particularly relates to a sound source apparatus that calculates output volume of each sound source output device according to a relative distance between a user and the sound source apparatus.

Description of Related Art

With progress of digital technology and continuous development of material living standards, enjoying a variety of video and audio entertainment via a sound source apparatus has already become a universal recreation. To embrace a life of digital entertainment with a higher quality, multichannel speakers are indispensable equipments. Currently, common sound source apparatuses primarily play the audio by using dual channel speakers (such as 2.0 surround sound and 2.1 surround sound) and multichannel speakers (such as 5.1 surround sound and 7.1 surround sound) so that a user is able to enjoy a stereo effect as if he or she is personally on the scene.

However, when a common sound source apparatus plays music, the user can only adjust the volume based on individual preferences. In other words, while listening to music in the current space, the user needs to adjust the volume by himself or herself if the user's relative distance and direction from the sound source apparatus has changed. Therefore, if the user does not adjust the volume, it is difficult for the sound source apparatus itself to present an optimal sound effect to the user. Besides, all of the speakers in the sound source apparatus can only display the volume adjusted by the user. It is impossible to change the volume of an individual speaker only, so as to meet different needs of the user (or a plurality of users) when the user is at different distances from or in different directions of the sound source apparatus.

SUMMARY OF THE INVENTION

In view of this, the invention provides a sound source apparatus that dynamically adjusts output volume of each of the sound source output devices, and that calculates playback volume and sound field intensity based on different needs of one or more users when the users are at different distances from the sound source apparatus or in different directions of the sound source apparatus.

The invention provides a sound source apparatus for receiving an audio signal and displaying the audio signal. The sound source apparatus includes at least two sound source output devices, at least two distance sensors, and a processor. Each distance sensor is installed respectively corresponding to each sound source output device, and is configured to detect at least one target to generate sensing signals. The processor is coupled to the sound source output devices and to the distance sensors, and receives the audio signal. When the processor determines that the at least one target meets a sensing range through respectively receiving the sensing signals generated by each distance sensor, the processor further calculates output volume of each sound source output device respectively according to a relative distance between each distance sensor and the at least one target.

In an exemplary embodiment of the invention, the sensing signals are clock signals, and when an amount of pulses in the clock signals detected by at least one distance sensor of the at least two distance sensors within a unit of time is calculated to be greater or equal than a quantity threshold, the output volume of each sound source output device is calculated according to a relation between the amount of pulses and the relative distance.

In an exemplary embodiment of the invention, the sound source apparatus further includes a wireless transmission device, and the processor receives the audio signal through the wireless transmission device.

In an exemplary embodiment of the invention, the wireless transmission device is connected to an electronic device via a wireless communication network and receives the audio signal from the electronic device. Here the audio signal is an audio file played by the electronic device.

In an exemplary embodiment of the invention, the sensing signals are clock signals, and when an amount of pulses in the clock signals detected by at least one distance sensor of the at least two distance sensors within a unit of time is calculated to be smaller than a quantity threshold, the processor determines whether the wireless transmission device and the electronic device are in a connected state.

In an exemplary embodiment of the invention, when the wireless transmission device and the electronic device are in the connected state, the processor turns current output volume of each sound source output device corresponding to the at least one distance sensor into power saving volume. Here the power saving volume of each sound source output device is smaller than the current output volume of each sound source output device.

In an exemplary embodiment of the invention, when the wireless transmission device and the electronic device are not in the connected state, the processor stops receiving the audio signal from the electronic device.

In an exemplary embodiment of the invention, the distance sensors include a pyroelectric infrared radial sensor, an ultrasonic sensor, or a laser light sensor.

In an exemplary embodiment of the invention, the sound source apparatus further includes a driver that is coupled to the processor and to each sound source output device. Here the driver, based on the output volume of each sound source output device calculated by the processor, is configured to drive each sound source output device to display the audio signal at each output volume.

In an exemplary embodiment of the invention, the at least one target includes at least one human body.

Based on the above, in the foregoing exemplary embodiments, a sound source apparatus is provided, in which a plurality of sound source output devices are equipped with corresponding distance sensors, so that the sound source apparatus, based on sensing signals detected by the distance sensors, calculates output volume of each sound source output device according to a relative distance between each distance sensor and at least one target (for example, a user). Accordingly, the sound source apparatus is able to provide optimal playback volume and sound field intensity that correspond to the user's relative distances and directions from the sound source apparatus, so as to provide a better and more convenient experience when the user uses the sound source apparatus to listen to music.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

To make a sound source apparatus meet different needs of a user (or a plurality of users) when the user are at different distances from the sound source apparatus or in different directions of the sound source apparatus, this invention provides a sound source apparatus, in which a plurality of sound source output devices (such as speakers) are equipped with corresponding distance sensors, so that the sound source apparatus calculates output volume of each sound source output device based on sensing signals detected by the distance sensors. As a result, the sound source apparatus is able to provide optimal playback volume and sound field intensity that correspond to the user's relative distances and directions from the sound source apparatus.

Figure 1:
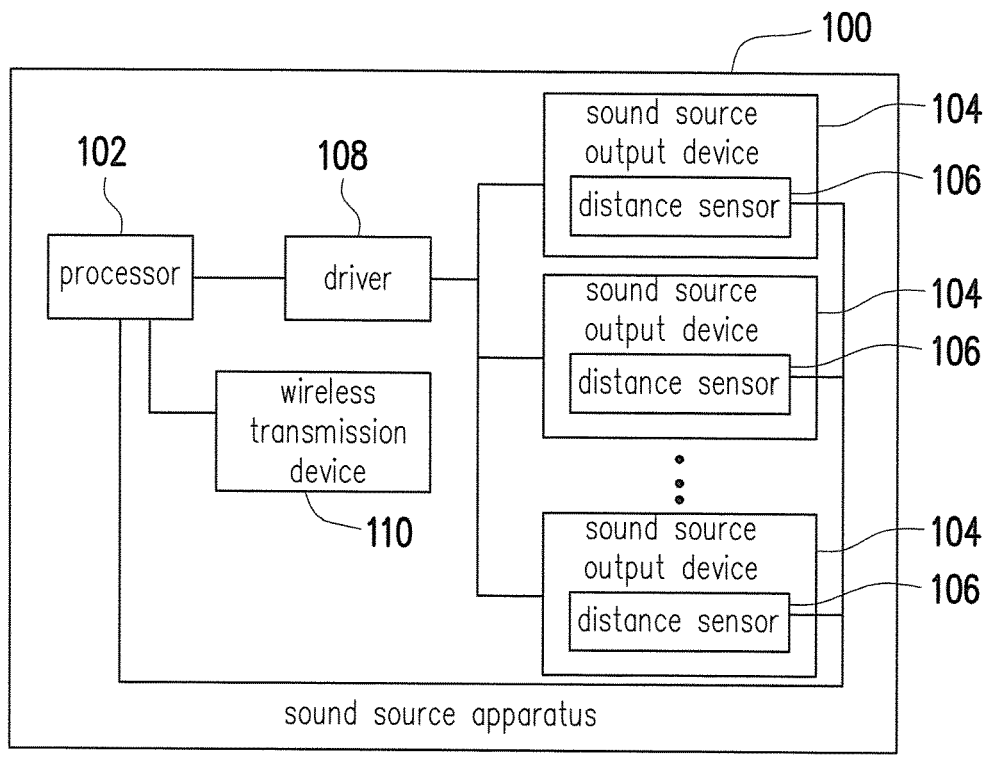
FIG. 1 is a block diagram of the sound source apparatus according to an exemplary embodiment of the invention.

FIG. 1 is a block diagram of the sound source apparatus according to an exemplary embodiment of the invention.

Please refer to FIG. 1. In this exemplary embodiment of the invention, a sound source apparatus 100 is, for example, a Bluetooth stereo sound source apparatus, and the sound source apparatus 100 includes a processor 102, at least two sound source output devices 104, at least two distance sensors 106, and a driver 108.

The processor 102 is coupled to each distance sensor 106, and is coupled to each sound source output device 104 through the driver 108, and is for controlling the overall operation of the sound source apparatus 100. Here the processor 102 is, for example, a central processing unit (CPU) or a micro controller unit (MCU).

The sound source output devices 104 are for displaying an audio signal that comes from an external electronic device. By providing the sound source output devices 104 to the sound source apparatus 100, the acoustic wave as displayed is scattered 360 degrees in all directions, so that no matter which position relative to the sound source apparatus 100 a user is in, the user is able to hear the sound emitted by the sound source apparatus 100. Besides, the sound source apparatus 100 also includes a wireless transmission device 110 (for example, a Bluetooth module), and the external electronic device is, for example, an electronic device with wireless transmission function (for example, a Bluetooth system) such as a traditional mobile phone, a smartphone, a personal digital assistant (PDA), a notebook, a tablet computer, and a music player. The wireless transmission device 110 of the sound source apparatus 100 pairs with the external electronic device via a wireless communication network (for example, a Bluetooth protocol), and receives the audio signal from the external electronic device. Accordingly, the processor 102 receives the audio signal through the wireless transmission device 110, so that the user may play the audio file in the electronic device by transmitting the file to the sound source apparatus 100 via the wireless communication network.

In the exemplary embodiment of the invention, each sound source output device 104 is further equipped with at least one distance sensor 106 respectively, and each distance sensor 106 detects at least one target (for example, a human body or the user) to generate sensing signals. In this exemplary embodiment, the distance sensor 106 is exemplified by a pyroelectric infrared radial sensor (PIR). However, the present invention does not limit the type of the distance sensor. For example, in another exemplary embodiment, the distance sensor may also be an ultrasonic sensor or a laser light sensor. Specifically, an infrared center wavelength corresponding to constant human body temperature (approximately 37° C.) is approximately 10 μm. Therefore, when a person passes through a sensing range of the distance sensor 106, by observing if the distance sensor 106 detects an infrared with a specific wavelength released by a human body, it is determinable whether someone is within the sensing range of the distance sensor 106. A sensing element on the distance sensor 106 emits current sensing signals based on the detected amount of change in temperature. Accordingly, the processor 102 further calculates output volume of each sound source output device 104 respectively according to a relative distance between each distance sensor 104 and the at least one target. And based on the output volume of each sound source output device 104 calculated by the processor 102, the driver 108 drives each sound source output device 104 to display the audio signal at each output volume In addition, the sound source apparatus 100 may further include at least one volume control device (not shown). The volume control device is, for example, a control button or a control knob on the sound source apparatus 100, or the volume control device may also be keys installed on a remote control. Accordingly, the user adjusts the volume of the audio signal displayed by the sound source apparatus 100 via the at least one volume control device.

Figure 2:
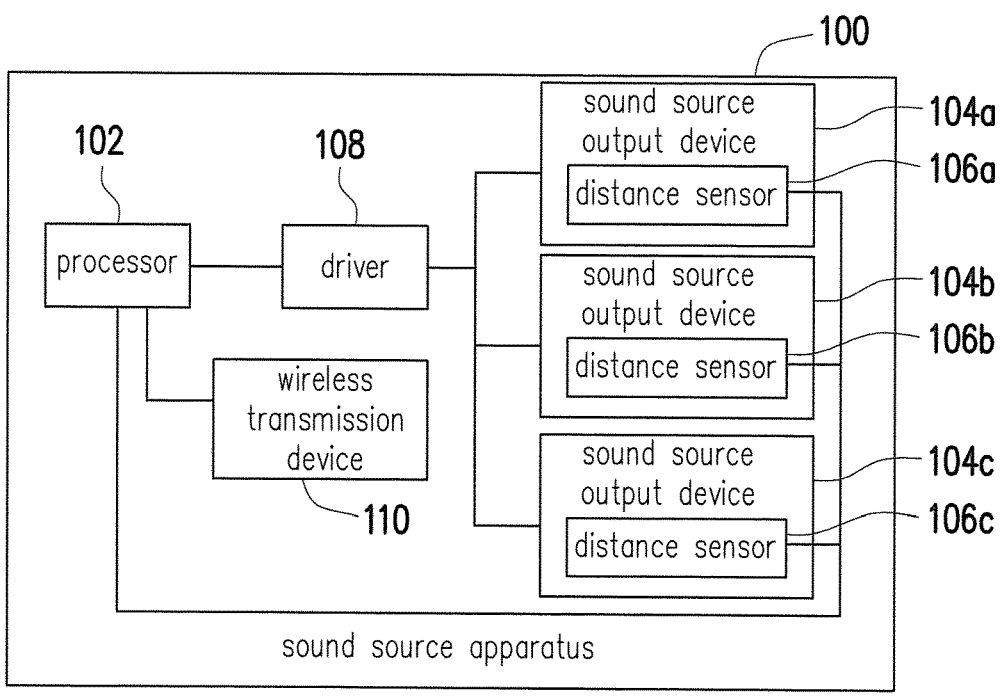
FIG. 2 is a block diagram of the sound source apparatus according to another exemplary embodiment of the invention.
Figure 3A:
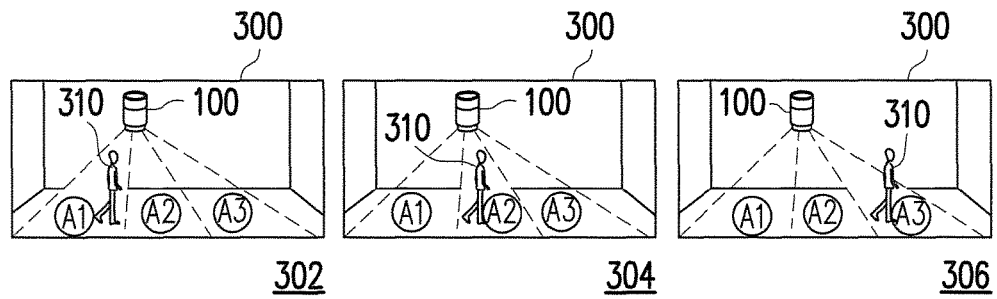
FIGS. 3A to 3C are schematic views showing the relative relations between the sound source apparatus and users according to an exemplary embodiment of the invention.
Figure 3B:
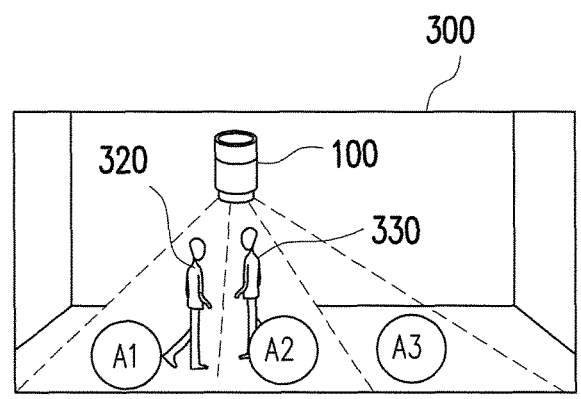
Figure 3C:
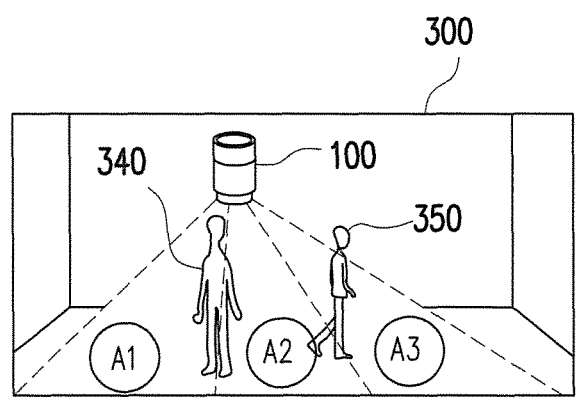

FIG. 2 is a block diagram of the sound source apparatus according to another exemplary embodiment of the invention. FIGS. 3A to 3C are schematic views showing the relative relations between the sound source apparatus and users according to an exemplary embodiment of the invention. To illustrate the operation of the sound source apparatus 100 of this invention more clearly, in the following, a plurality of exemplary embodiments are described in detail with reference to the accompanying drawings of the invention.

Please refer to FIG. 1 and FIG. 2 first. In FIG. 2, there is a sound source apparatus 100 which is essentially identical or similar to the sound source apparatus 100 of FIG. 1. In this exemplary embodiment, the sound source apparatus 100 at least includes three sound source output devices respectively equipped with a distance sensor (as shown in FIG. 2). However, it should be understood that the invention is not limited thereto. For example, depending on functional design or actual needs, the sound source apparatus 100 may further include more than three sound source output devices, or may only include at least two sound source output devices, and each sound source output device may be equipped with at least one distance sensor (as shown in FIG. 1).

Please refer to FIG. 2 and FIGS. 3A to 3C. The sound source apparatus 100 includes a sound source output device 104a, a sound source output device 104b and a sound source output device 104c, and the sound source output device 104a, the sound source output device 104b and the sound source output device 104c are respectively equipped with a distance sensor 106a, a distance sensor 106b and a distance sensor 106c.

In this exemplary embodiment, the sound source apparatus 100 is provided in a space 300 as shown in FIGS. 3A to 3C. A sensing range of the distance sensor 106a is, for example, A1, a sensing range of the distance sensor 106b is, for example, A2, and a sensing range of the distance sensor 106c is, for example, A3.

Figure 4:
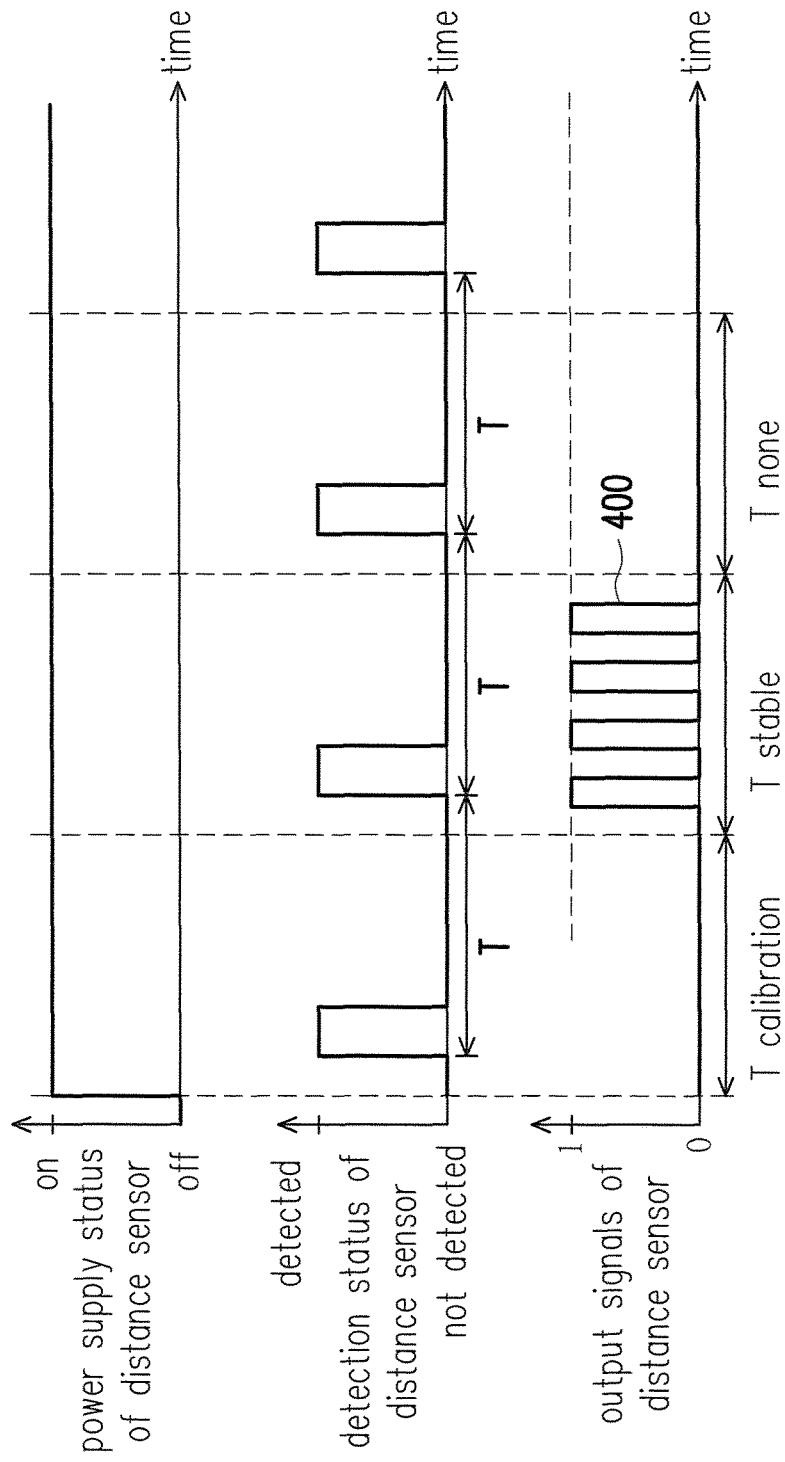
FIG. 4 is a schematic view illustrating the principle of operation of the distance sensor according to an exemplary embodiment of the invention.

FIG. 4 is a schematic view illustrating the principle of operation of the distance sensor according to an exemplary embodiment of the invention.

Please refer to FIG. 4. The sensing signals generated by the distance sensor are clock signals. After a distance sensor is activated, the distance sensor detects the amount of change in temperature within its sensing range at every interval T, and emits a clock signal 400 after detecting an infrared released by a human body. Specifically, when the distance sensor detects a moving human body, the distance sensor first emits a high voltage (i.e. a logic "1") and then emits a low voltage (i.e. a logic "0"). In other words, when a user moves or stays within the sensing range of the distance sensor, the distance sensor emits clock signals that constantly switch between a high voltage level and a low voltage level (i.e. clock signals corresponding to a unit of time $T_{stable}$ in FIG. 4) rather than clock signals that stay at a high voltage level. By contrast, when the distance sensor continuously does not detect any moving human body, the distance sensor emits clock signals that are continuously at a low voltage level (i.e. clock signals corresponding to a unit of time $T_{none}$ in FIG. 4). In light of this, when there is at least one human body moving or staying within the sensing range of the distance sensor, the clocks signals emitted by the distance sensor include a plurality of pulses. Furthermore, the more pulses (i.e. denser) the clock signals contain within a unit of time, the closer the user is from the distance sensor. By contrast, the less pulses (i.e. sparser) the clock signals contain within a unit of time, the farther the user is from the distance sensor. It is worth noting that after the distance sensor is activated, a period of time $T_{calibration}$ is needed to perform calibration, and distance sensors based on different specifications have different time of calibration $T_{calibration}$. For example, the time of calibration $T_{calibration}$ is approximately 10 to 60 seconds. Hence, the signals emitted by the distance sensor within the time of calibration $T_{calibration}$ has no reference value.

Based on the principle of operation of the distance sensor as delineated above, the processor 102 of the invention determines if at least one target meets a sensing range according to the clock signals received from the distance sensors 106a-106c. What is meant by saying that the at least one target meets the sensing range is, for example, that the clock signals generated by the distance sensor have a greater amount of pulses within a unit of time than a quantity threshold. For example, it is assumed that the unit of time is 2 seconds and the quantity threshold is 3, so when the distance sensor detects that the clock signals generated by the at least one target have an amount of pulses greater than 3 in every two second, the processor 102 then determines that the at least one target meets the sensing range, and calculates output volume of each of the sound source output devices 104a to 104c based on the relation between the amount of pulses and the relative distance.

Figure 5:
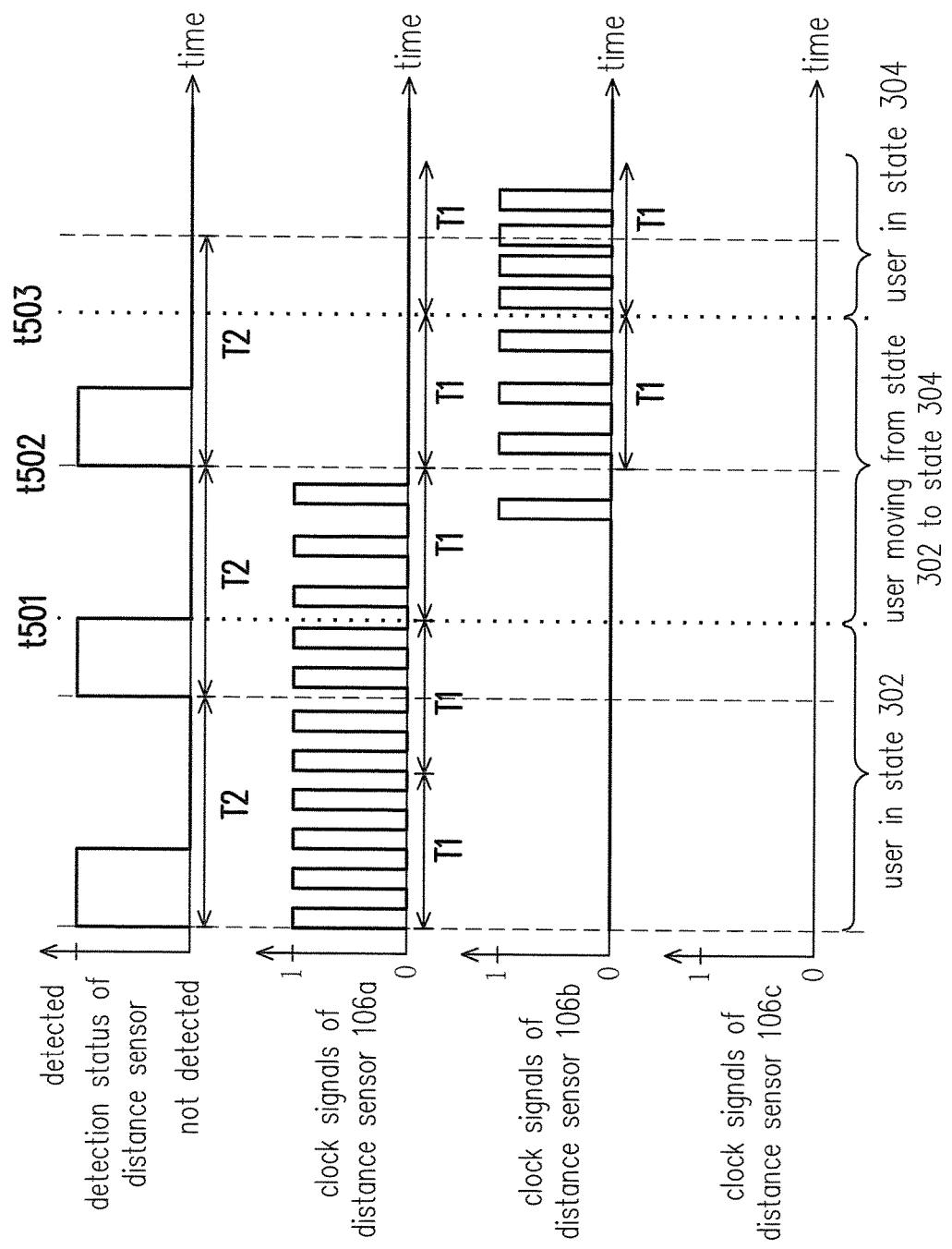
FIG. 5 is a schematic view showing clock signals of a plurality of distance sensors according to an exemplary embodiment of the invention.

FIG. 5 is a schematic view showing clock signals of a plurality of distance sensors according to an exemplary embodiment of the invention.

Please refer to FIG. 3A first. A state 302, a state 304 and a state 306 respectively represent the state in which a user 310 in the space 300 is within the sensing range A1 of the distance sensor 106a, the sensing range A2 of the distance sensor 106b, and the sensing range A3 of the distance sensor 106c. Please refer to FIG. 3A and FIG. 5. It is assumed that the maximum volume displayed by the sound source apparatus 100 is 150 dB, and the sound source apparatus 100 is already activated and is playing music at the initial volume (for example, 80 dB). When the user 310 enters into the state 302, the processor 102 receives clock signals that come from the distance sensors 106a to 106c, and determines if the clock signals have a greater amount of pulses than the quantity threshold "3" within two seconds (i.e. within a unit of time T1). Here, the amount of pulses in the clock signals of the distance sensor 106a is "4" per unit of time T1. Therefore, the processor 102 then determines that at this time the clock signals of the distance sensor 106a have a greater amount of pulses than the quantity threshold, so as to automatically increase the volume of the sound source output device 104a corresponding to this amount of pulses. For example, the current volume (i.e. 80 dB) of the sound source output device 104a is increased by 20 dB to 100 dB. On the other hand, the processor 102 determines that the clocks signals of both of the distance sensor 106b and the distance sensor 106c do not have an amount of pulses (i.e. "0") greater than the quantity threshold (i.e. "3"). Therefore, the processor 102 does not adjust the volume of the sound source output device 104b and the sound source output device 104c. Or in another exemplary embodiment, the processor 102 decreases the volume of the sound source output device 104b and the sound source output device 104c. It should be noted that the maximum volume displayed by the sound source apparatus 100 is 150 dB. Therefore, the processor 102 only adjusts the volume of each sound source output device to 150 dB at most.

Then, it is assumed that the user 310 at a time point t501 moves toward the sensing range A2 of the distance sensor 106b. Because the user 310 starts to leave the sensing range A1 of the distance sensor 106a, after the time point t501, the amount of pulses in the clock signals of the distance sensor 106a decreases to "3" within the unit of time T1, and the amount of pulses in the clock signals of the distance sensor 106b increases to "1" within the unit of time T1. Particularly, at this time the amount of pulses in the clock signals of the distance sensor 106a is still greater or equal to the quantity threshold within the unit of time T1. Therefore, the processor 102 maintains the current volume of the sound source output device 104a (for example, 100 dB). Or, the processor 102 sets the corresponding volume as 90 dB by default when the amount of pulses is "3" within the unit of time T1. Therefore, the processor 102 decreases the current volume (i.e. 100 dB) of the sound source output device 104a by 10 dB.

Afterwards, the user 310 still continues to approach the sensing range A2 of the sound source output device 106b. Therefore, after a time point t502, the amount of pulses in the clock signals of the sound source output device 106b increases to "3" within the unit of time T1. And after a time point t503 (that is, when the user is in the state 304), the amount of pulses in the clock signals of the distance sensor 106b increases to "4" within the unit of time T1. In a similar way, when the amount of pulses is "3" within the unit of time T1, the processor 102 increases the current volume of the corresponding sound source output device 104b by 10 dB to 90 dB, and when the amount of pulses is "4" within the unit of time T1, the processor 102 increases the current volume of the corresponding sound source output device 104b by 10 dB more to 100 dB.

Particularly, in the exemplary embodiment of the invention, per specific unit of time T2, the processor 102 determines if the distance sensors 106a to 106c corresponding to each of the sound source output devices 104a to 104c detect at least one target that meets the sensing range, so as to continuously calculate the volume of each of the sound source output devices 104a to 104c. Please refer to FIG. 5. After the time point t502, the amount of pulses in the clock signals of the distance sensor 106a decreases to "0" within the unit of time T1, and the amount of pulses in the clock signals of the distance sensor 106c still stays as "0" within the unit of time T1. Therefore, the processor 102 then determines that the sound source output device 104a and the sound source output device 104c do not detect the at least one target that meets the sensing range. As a result, the processor 102 adjusts the output volume of the sound source output device 104a, whose current volume is 90 dB or 100 dB, back to the initial volume (for example, 80 dB). In addition, because the sound source output device 104c currently plays music at the initial volume (for example, 80 dB), the processor 102 does not adjust the volume of the sound source output device 104c. In this way, even though the user 310 moves in the space 300 provided with the sound source apparatus 100, such as moving from the left to the sound source apparatus 100 to the right to the sound source apparatus 100, through the mechanism that dynamically adjusts the volume as delineated above in this invention, the user feels the same sound field intensity no matter which direction from the sound source apparatus the user is at, or how far or how close the user is from the sound source apparatus.

It is worth noting that in the above exemplary embodiment, the closer the target is to the distance sensor, the greater the output volume of the corresponding sound source output device is. However, the invention is not limited thereto. For example, in another exemplary embodiment, the closer the target is to the distance sensor, the smaller the output volume of the corresponding sound source output device is. Besides, the unit of time, the specific unit of time, the quantity threshold, and the number of decibels that increases or decreases corresponding to different amounts of pulses within the unit of time T1 as mentioned above merely illustrate one exemplary embodiment. A person ordinarily skilled in the art should understand that the invention is not limited thereto. These numerical values are adjustable depending on functional design or actual needs.

Figure 6:
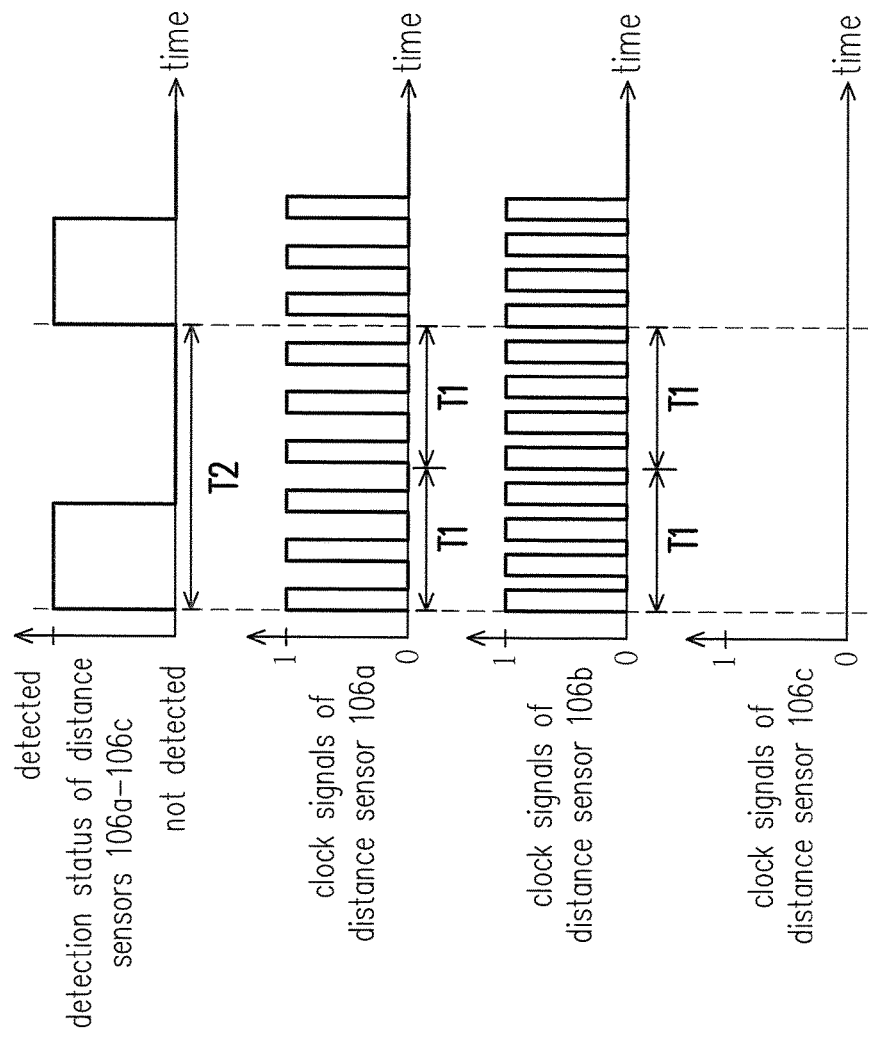
FIG. 6 is a schematic view showing clock signals of a plurality of distance sensors according to another exemplary embodiment of the invention.

FIG. 6 is a schematic view showing clock signals of a plurality of distance sensors according to another exemplary embodiment of the invention.

In another exemplary embodiment of the invention, when a plurality of users are in the space 300 provided with the sound source apparatus 100, the sound source apparatus 100 is also able to provide optimal volume and sound field intensity that correspond to the users' relative distances and directions from the sound source apparatus. Specifically, please refer to FIG. 3B and FIG. 6. It is assumed that the sound source apparatus 100 is already activated and is playing music at the initial volume (for example, 80 dB). And if a user 320 and a user 330 are respectively within the sensing range A1 of the sound source output device 106a and within the sensing range A2 of the sound source output device 106b, the processor 102 then receives clock signals that come from the sound source output devices 106a to 106c, and determines if the clock signals have a greater amount of pulses than a quantity threshold "3" within 2 seconds (i.e. within a unit of time T1). Here, the processor 102 determines that the amount of pulses in the clock signals of the sound source output device 106a is "3" per unit of time T1, that the amount of pulses in the clock signals of the sound source output device 106b is "4" per unit of time T1, and that the amount of pulses in the clock signals of the sound source output device 106b is "0" per unit of time T1. In other words, both of the sound source output device 104a and the sound source output device 104b detect at least one target that meets the sensing range, while the sound source output device 104c does not detect the at least one target that meets the sensing range. Accordingly, the processor 102 further compares the amount of pulses that belongs to the sound source output device 104a with the amount of pulses that belongs to the sound source output device 104b. Since the amount of pulses in the clock signals of the distance sensor 106b per unit of time T1 is greater than the amount of pulses in the clock signals of the distance sensor 106a per unit of time T1, the processor 102 increases the current volume (i.e. 80 dB) of the sound source output device 104b by 20 dB, and increases the current volume (i.e. 80 dB) of the sound source output device 104a by 10 dB. In other words, the processor 102 increases the volume of the sound source output device 104b more than it does the volume of the sound source output device 104a. It should be noted that in the above exemplary embodiment, the more the amount of pulses detected by the distance sensor is, the greater the output volume of its corresponding sound source output device is. However, the invention is not limited thereto. For example, in another exemplary embodiment, the more the amount of pulses detected by the distance sensor is, the smaller the output volume of its corresponding sound source output device is.

Figure 7:
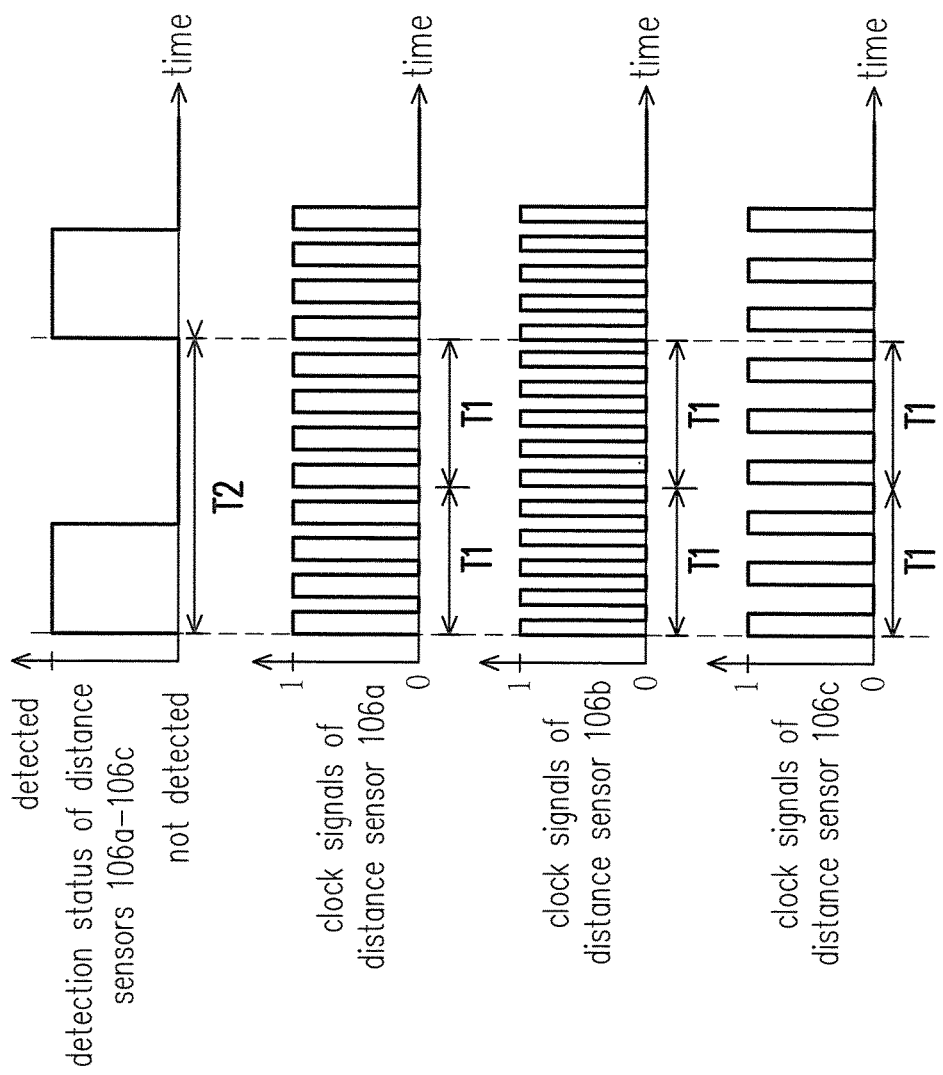
FIG. 7 is a schematic view showing clock signals of a plurality of distance sensors according to yet another exemplary embodiment of the invention.

FIG. 7 is a schematic view showing clock signals of a plurality of distance sensors according to yet another exemplary embodiment of the invention.

In yet another exemplary embodiment of the invention, when a plurality of users are in the space 300 provided with the sound source apparatus 100 and when at least one user is simultaneously within the sensing ranges of two distance sensors of the sound source apparatus 100, the sound source apparatus 100 is also able to provide optimal volume and sound field intensity that correspond to the users' relative distances and directions from the sound source apparatus.

Please refer to FIG. 3C and FIG. 7. Here it is assumed that the sound source apparatus 100 is already activated and is playing music at the initial volume (for example, 80 dB), and that a user 340 is between the sensing range A1 of the distance sensor 106a and the sensing range A2 of the distance sensor 106b, and a user 350 is between the sensing range A2 of the distance sensor 106b and the sensing range A3 of the distance sensor 106c. Similarly, the processor 102 then receives clock signals that come from the sound source output devices 106a to 106c, and determines if the amount of pulses in the clock signals is greater than a quantity threshold "3" within 2 seconds (i.e. within a unit of time T1). Then, the processor 102 determines that the amount of pulses in the clock signals of the sound source output device 106a is "4" per unit of time T1, that the amount of pulses in the clock signals of the sound source output device 106b is "5" per unit of time T1, and that the amount of pulses in the clock signals of the sound source output device 106c is "3" per unit of time T1. In other words, the sound source output device 104a, the sound source output device 104b and the sound source output device 104c all detect at least one target that meets the sensing range. Accordingly, the processor 102 further compares the amounts of pulses in the clock signals that are generated by the distance sensor 106a, the distance sensor 106b, and the distance sensor 106c within the unit of time T1, and arranges the amounts of the pulses from more to less and then correspondingly increases the volume of the corresponding sound source output devices from great to small. For example, the current volume (i.e. 80 dB) of the sound source output device 104b is increased by 30 dB, the current volume (i.e. 80 dB) of the sound source output device 104a is increased by 20 dB, and the current volume (i.e. 80 dB) of the sound source output device 104c is increased by 10 dB. It should be noted that in the above exemplary embodiment, the processor arranges the amounts of the pulses from more to less and then correspondingly increases the volume of the corresponding sound source output devices from great to small. However, the invention is not limited thereto. For example, in another exemplary embodiment, the processor arranges the amounts of the pulses from more to less and then correspondingly increases the volume of the corresponding sound source output devices from small to great.

It is worth noting that in the exemplary embodiment of the invention, when the sound source apparatus 100 is activated, a plurality of distance sensors that the sound source output devices 104 are equipped with are also activated to detect the relative distances of the user within the sensing ranges. Or, in another exemplary embodiment, the sound source apparatus 100 is further equipped with a control button for activating functions of the distance sensors. It is after the user triggers the control button that the processor 102 begins to perform the operation of determining if at least one target meets the sensing ranges of the distance sensors. Or, the processor 102 performs the operation of determining if at least one target meets the sensing ranges of the distance sensors only after detecting trigger signals that are generated when the user adjusts the volume through a volume control device.

The above exemplary embodiment is for illustrating how the processor 102 calculates the output volume of each of the sound source output devices 104a to 104c based on the relation between the amount of pulses and the relative distance. Particularly, in another exemplary embodiment of the invention, when the processor 102 calculates that the amount of pulses in the clock signals detected by at least one distance sensor within a unit of time is smaller than the quantity threshold, the processor 102 then further determines whether the wireless transmission device 110 and the external electronic device that provides an audio signal are in a connected state. As delineated above, the wireless transmission device 110 of the sound source apparatus 100 are connected to the external electronic device via the wireless communication network and receives the audio signal from the external electronic device, so that the processor 102 receives the audio signal through the wireless transmission device 110. In other words, when the at least one target (for example, the user) leaves the sound source apparatus 100, the processor 102 determines if the wireless transmission device 110 and the electronic device that provides the audio signal are still in the connected state.

For example, the user connects the electronic device of himself/herself with the wireless transmission device 110 of the sound source apparatus 100, and plays the audio file in the electronic device through each sound source output device of the sound source apparatus 100. When the user leaves the sound source apparatus 100 (that is, the amount of pulses in the clock signals detected by the at least one distance sensor of the sound source apparatus 100 within a unit of time is smaller than the quantity threshold), the user probably does not take the electronic device away. For example, the electronic device of the user is still placed within a connecting range of the wireless transmission device 110. Accordingly, the processor 102 then determines that the wireless transmission device 110 and the electronic device that provides the audio signal are still in the connected state, so as to turn the current output volume of each sound source output device corresponding to the at least one distance sensor into power saving volume. The power saving volume, for example, is smaller than the current output volume. Or in another exemplary embodiment, the power saving volume is, for example, muted. By contrast, when the user leaves the sound source apparatus 100 and takes the electronic device away so as to make the electronic device leave the connecting range of the wireless transmission device 110, the processor 102 then determines that the wireless transmission device 110 and the electronic device that provides the audio signal are not in the connected state. As a result, the processor 102 stops receiving the audio signal from the electronic device and turns off the current displaying of the audio signal. Particularly, through this mechanism an effect of power saving is achieved when the user leaves the sound source apparatus 100. The user also avoids the trouble of needing to reconnect the electronic device to the wireless transmission device 110 of the sound source apparatus 100.

In summary of the above, in this invention, the sound source output devices of the sound source apparatus are respectively equipped with the distance sensors, so that the sound source apparatus is able to distinguish one or more users' relative distances and directions from the sound source apparatus based on the sensing signals detected by the distance sensors. As a result, the sound source apparatus dynamically provides optimal playback volume and sound field intensity that correspond to the user's relative distances and directions from the sound source apparatus. In this way, the user does not need to adjust the volume by himself or herself when the user's distance and direction from the sound source apparatus have changed. In addition, thanks to the mechanism of determining if the electronic device that provides the audio signal is still connected to the sound source apparatus when the user leaves the sound source apparatus, the effect of power saving is effectively achieved. The user also avoids the problem of needing to reconnect the electronic device to the sound source apparatus. Accordingly, the invention provides a better and more convenient experience to the user when the user uses the sound source apparatus to listen to music.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A sound source apparatus for receiving an audio signal and displaying the audio signal, comprising:
    at least two sound source output devices;
    at least two distance sensors, installed respectively corresponding to each of the at least two sound source output devices, each of the at least two distance sensors respectively configured to detect at least one target to generate a sensing signal; and
    a processor, coupled to the at least two sound source output devices and the at least two distance sensors, wherein the processor receives the audio signal, and when the processor determines that the at least one target meets a sensing range through respectively receiving the sensing signal generated by each of the at least two distance sensors, the processor calculates output volume of each of the at least two sound source output devices respectively according to a relative distance between each of the at least two distance sensors and the at least one target,
    wherein the sensing signal is a clock signal, and when an amount of pulses in the clock signal detected by at least one distance sensor of the at least two distance sensors within a unit of time is calculated to be greater or equal than a quantity threshold, the output volume of each of the at least two sound source output devices is calculated according to a relation between the amount of pulses and the relative distance.

2. The sound source apparatus according to claim 1, further comprising a wireless transmission device, the processor receiving the audio signal through the wireless transmission device.

3. The sound source apparatus according to claim 2, wherein the wireless transmission device is connected to an electronic device via a wireless communication network and receives the audio signal from the electronic device, the audio signal being an audio file played by the electronic device.

4. The sound source apparatus according to claim 3, wherein the sensing signal is a clock signal, and when an amount of pulses in the clock signal detected by at least one distance sensor of the at least two distance sensors within a unit of time is calculated to be smaller than a quantity threshold, the processor determines whether the wireless transmission device and the electronic device are in a connected state.

5. The sound source apparatus according to claim 4, wherein when the wireless transmission device and the electronic device are in the connected state, the processor turns current output volume of each of the at least two sound source output devices corresponding to the at least one distance sensor into power saving volume, and power saving volume of each of the at least two sound source output devices is smaller than the current output volume of each of the at least two sound source output devices.

6. The sound source apparatus according to claim 4, wherein when the wireless transmission device and the electronic device are not in the connected state, the processor stops receiving the audio signal from the electronic device.

7. The sound source apparatus according to claim 1, wherein the at least two distance sensors comprise a pyroelectric infrared radial sensor, an ultrasonic sensor, or a laser light sensor.

8. The sound source apparatus according to claim 1, further comprising a driver that is coupled to the processor and to each of the at least two sound source output devices,
    wherein the driver, based on the output volume of each of the at least two sound source output devices calculated by the processor, is configured to drive each of the at least two sound source output devices to display the audio signal at each of the output volume.

9. The sound source apparatus according to claim 1, wherein the at least one target comprises at least one human body.

* * * * *